Nov. 13, 1951 J. MIHALYI 2,575,025
LIGHT LOCK FOR ROLL FILM SPOOLS
Filed June 30, 1949

Joseph Mihalyi
INVENTOR
BY *Daniel J. Maypres*
*J. Griffin Little.*
ATTORNEYS

Patented Nov. 13, 1951

2,575,025

UNITED STATES PATENT OFFICE 2,575,025

LIGHT LOCK FOR ROLL-FILM SPOOLS

Joseph Mihalyi, Rochester, N. Y., assignor to Eastman Kodak Company, Rochester, N. Y., a corporation of New Jersey Application June 30, 1949, Serial No. 102,227

3 Claims. (Cl. 242—71)

The present invention relates to photography, and more particularly to a novel roll-film spool on which a strip of film is adapted to be wound in a light-locked relation.

In early types of roll-film spools, the sensitized film was protected against light-fogging by providing a backing paper which was of such a length as to provide several outer convolutions overlying the film. In later forms of spools, this backing paper was eliminated, and outer convolutions of the film itself were utilized to protect the picture-carrying areas against light-fogging, as is well known. In one form of such later spools, the spool flanges were provided, adjacent their peripheries, with inwardly extending beads or ribs which were spaced a distance apart slightly less than the width of the film. In winding the film onto such a spool, the film was bowed slightly transversely so as to pass freely between the beads. After passing the beads, the film flattened out and was wound in overlying convolutions on the spool core or hub.

As practically all the light-fogging that occurs on the inner convolutions of the wound film originates from the light which passes through the spaces between the marginal edges of the film and the inner surfaces of the spool flanges, obviously means must be provided to afford the necessary light lock at such points. However, both film and spool dimensional tolerances make it impossible to eliminate these spaces. In order to solve this problem, the present invention provides novel light-lock members arranged adjacent the spool flanges and positioned between the spool core and the peripheral beads on the flanges. These members yieldably engage the marginal edges of the film strip, particularly adjacent the beads, to form a light lock therewith. In the preferred construction, these light-lock members are in the form of spherically dished spring washers which lie against the spool flanges and are dished inwardly so that their peripheries extend inwardly slightly from the flanges so as to engage yieldably with the outer film convolutions, adjacent to the beads, to prevent passage of light through the space between the film edges and the spool flanges to fog the film, the advantages of which are apparent.

The present invention has as its principal object the provision of a novel light-lock arrangement for a film spool.

A further object of the invention is the provision of such a light lock which is simple in construction, inexpensive to manufacture, easy to assemble on the spool, and highly effective in use.

Yet another object of the invention is the provision of a light-lock arrangement which seals effectively the spaces between the marginal edges of the wound film and the inner surfaces of the spool flanges.

Still another object of the invention is the provision of a film spool with flexible dish-shaped washers which compensate for film and spool tolerances, yet affords an effective light lock to protect the film against fogging due to light leakage between the film edges and the film flanges.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
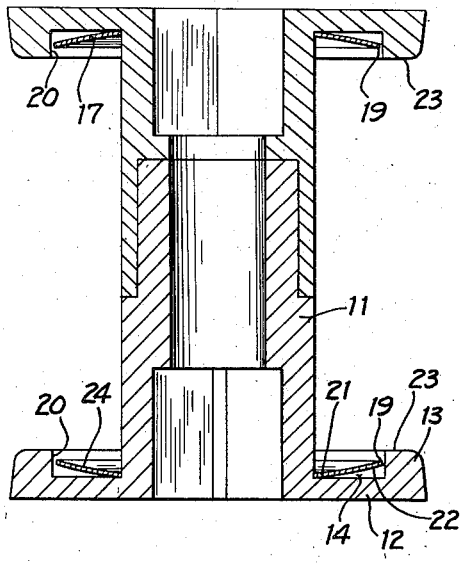
Fig. 1 is a longitudinal sectional view of a film spool of well known construction, showing the relation thereto of the light-lock members constructed in accordance with the preferred embodiment of the present invention and the relation of the members prior to spooling.
Figure 3:
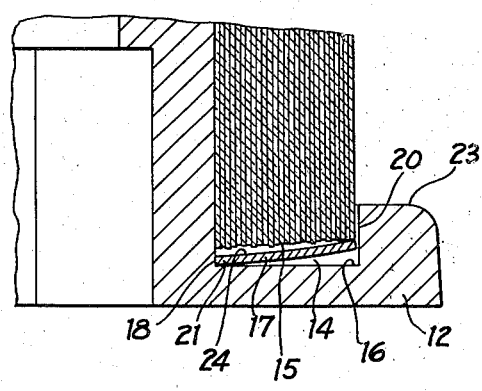
Fig. 3 is a sectional view of a portion of the film spool illustrated in Figs. 1 and 2, but on a larger scale than the latter, showing the relation of the light-lock washers with the spooled film to afford a light lock therefor.
Figure 3:
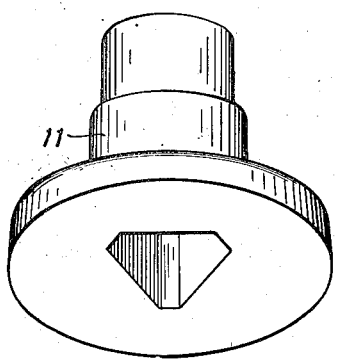

The drawings show a film spool formed with a hub or core 11, the ends of which are provided with radially extending flanges 12, the peripheries of which are formed with inwardly extending annular beads or ribs 13 which are spaced apart a distance less than the width of the film to be wound thereon, as indicated in Fig. 3. The core may be formed to provide telescoping sections, as shown in Fig. 1, so that the core and its associated parts may be molded or die-cast. As the spool so far described is of well known construction and forms no part of the present invention, further details are not deemed necessary.

Due both to film and spool tolerances, spaces 14 occur between the marginal edges 15 of the wound film convolutions and the inner surfaces 16 of the spool flanges, as clearly illustrated in Fig. 3. Because of such spaces, light will enter and fog the film, as is deemed apparent. In order to prevent such fogging, the present invention provides means for blocking off or sealing these spaces so as to prevent any light which may enter from fogging the film.

To secure this result, a pair of spherically dished spring washers 17 are positioned adjacent the flanges 12, as clearly illustrated in Figs. 1 and 3. Each washer 17 is formed with a central opening 18 substantially equal in size to the outer surface of the core 11 to mount the washer on the core adjacent the flanges 12. These washers are of a diameter slightly less than that of the beads 13 so that the peripheries 19 of the washers lie within the inner axial edge 20 of the beads, as illustrated in Fig. 3. Also, each washer is dished inwardly so that the central portion 21, adjacent core 11, will lie against the inner face of the flange while the periphery 19 will be spaced inwardly or axially from the flange face 16, as shown at 22, Fig. 1. Furthermore, the peripheries 19 of the washers extend inwardly and are spaced from the faces 16 of the flanges 12 a distance less than the inner edge or face 23 of the beads, as shown in Fig. 3. Thus, the washers 17 lie between the core 11 and the beads 13 and are positioned wholly inside the latter.

Figure 2:
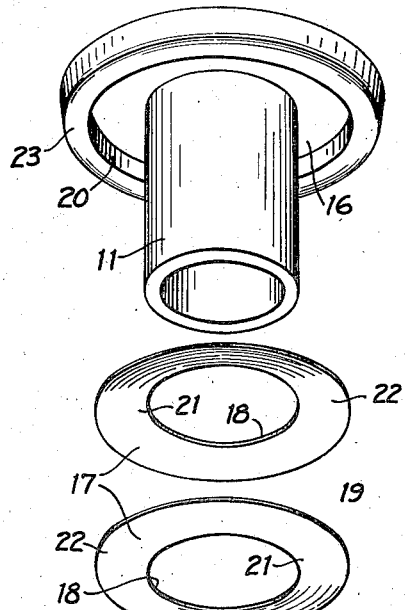
Fig. 2 is an exploded view of the spool and the light-lock members or washers, showing the arrangement of the parts.

The washers 17 may be assembled on the spool by separating the spool core, as shown in Fig. 2. The washers are then slid on the core sections with the concave sides facing inwardly, as shown in Figs. 1 and 3. The core sections are then connected as shown in Fig. 1. It will be apparent from an inspection of Fig. 3 that the washers provide a shield or seal between the marginal edges 15 of the film and the inner faces 16 of the flanges 12. When the film is wound on the spool, the inner convolutions may or may not contact the washers due to the necessary spool and film tolerances. However, due to the inward dishing of the washers, the film edges will gradually approach the inner surfaces 24 of the washers 17 as the film is wound, until finally the outer convolutions will finally engage frictionally with the surface 24 of the washers adjacent the peripheries 19 to afford the desired light lock at the outer convolutions of the film, as clearly illustrated in Fig. 3.

It will be apparent from an inspection of Fig. 3 that due to the engagement of the outer convolutions of the film with the inner surfaces 24 of the washers 17, light cannot pass between the washer and the edges 15 of the film. Also, any light which might pass between the outer film convolutions and the face 20 of the beads and finally enter the space 14 is prevented from reaching and fogging the film because of the presence of the washer 17, as clearly illustrated in Fig. 3. Thus, the flexible dish-shaped washers compensate for the necessary film and spool tolerances, yet provide the desired light lock to prevent fogging of the film, the advantages of which are deemed apparent to those in the art.

The present invention thus provides an effective light lock which compensates for the necessary manufacturing tolerances of the film and spool, yet provides the essential shield which prevents fogging due to leakage of light between the spool and film. This light-lock device is in the form of a pair of simple inexpensive dish-shaped washers which are simple in construction, easy to assemble on the spool, and which are highly effective in use.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

Having thus described my invention, what I claim is:

1. In a photographic film spool, the combination with a core on which a film strip is to be wound, flanges positioned on the ends of said core, inwardly extending annular beads formed on said flanges adjacent the peripheries thereof, the inner surfaces of said beads being spaced apart a fixed distance less than the width of said strip, of a pair of flexible spherically dished washers positioned on said core adjacent said flanges, said washers having a diameter less than said beads and being dished inwardly toward each other but with the peripheries thereof extending inwardly from said flanges a distance substantially less than said beads so that said washers will lie within said beads and will engage yieldably the marginal edges of said strip adjacent said beads to afford a light lock for the strip wound on said core.

2. In a photographic film spool, the combination with a core on which a film strip is to be wound, flanges positioned on the ends of said core, inwardly extending annular beads formed on said flanges adjacent the peripheries thereof, the inner surfaces of said beads being spaced apart a fixed distance less than the width of said strip, of a pair of flexible spherically dished washers positioned on said core adjacent said flanges, said washers having a diameter less than said beads so as to lie between the latter and said core, said washers being dished inwardly so that the washers will engage said flanges adjacent said core but will have their peripheries extending inwardly and spaced from said flanges adjacent said beads, the peripheries of said washers extending inwardly from said flanges a distance substantially less than said beads so that the periphery of said washers will lie within said beads and engage yieldably the marginal edges of the outer convolutions of the strip adjacent said beads to afford a light lock for the strip wound on said core.

3. In a photographic film spool, the combination with a core on which a film strip is to be wound, flanges positioned on the ends of said core, inwardly extending annular beads formed on said flanges adjacent the peripheries thereof, the inner surfaces of said beads being spaced apart a fixed distance less than the width of said strip so that the strip must be bowed transversely as it passes between said beads, of a pair of flexible spherically dished washers positioned on said core adjacent said flanges, said washers having portions which engage said flanges and are spaced a distance materially greater than the width of said strip before bowing, and peripheral portions adjacent said beads and spaced inwardly from said flanges a distance less than said beads so that the peripheral portions will be spaced apart a distance greater than said beads and a distance substantially equal to the unbowed width of said strip so as to engage the marginal edges of outer convolutions of said strip beyond said beads to provide a light lock for said edges adjacent said beads.

JOSEPH MIHALYI.

REFERENCES CITED

The following references are of record in the file of this patent:

UNITED STATES PATENTS

| Number | Name | Date |
| --- | --- | --- |
| 1,454,818 | Jones | May 8, 1923 |
| 1,469,018 | Kingsbury | Sept. 25, 1923 |
| 1,973,457 | Wittel | Sept. 11, 1934 |
| 2,346,075 | Mihalyi | Apr. 4, 1944 |
| 2,400,024 | Roehrl | May 7, 1946 |